3,574,219
1-(β-HYDROXYPHENETHYL)-2,3-DIMETHYL-3-(3-HYDROXYPHENYL)-PIPERIDINE
Hiroshi Kugita and Hirozumi Inoue, Tokyo-to, and Goro Hayashi, Osaka-fu, Japan, assignors to Tanabe Seiyaku Co., Ltd., Osaka, Japan
No Drawing. Filed Sept. 16, 1968, Ser. No. 762,354
Claims priority, application Japan, Sept. 27, 1967, 42/62,167, 42/62,168
Int. Cl. C07d 29/16
U.S. Cl. 260—294.7        1 Claim

ABSTRACT OF THE DISCLOSURE

The compound 1-(β-hydroxyphenethyl)-2,3-dimethyl-3-(3-hydroxyphenyl)-piperidine and its acid salts have analgesic activity.

Methods for manufacturing the compound and acid salts including reaction of 2,3-dimethyl-3-(3-hydroxyphenyl)-piperidine with styrene-oxide or reduction of 1-phenacyl-2,3-dimethyl-3-(3-hydroxyphenyl)-piperidine followed by acidification to form the acid salts.

---

This invention relates to a novel therapeutically useful compound, 1-(β-hydroxyphenethyl)-2,3-dimethyl-3(3-hydroxyphenyl)-piperidine and a process for the preparation thereof.

Recently, 1-phenacyl-2,3-dimethyl-3-(3-hydroxyphenyl)-piperidine having a remarkable analgesic activity with less toxicity had been reported. However, we have now found a more effective compound represented by the formula:

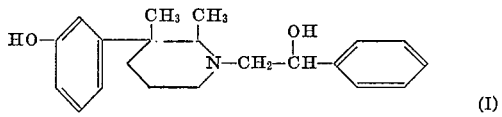

(I)

This compound shows a stronger analgesic activity than meperidine or morphine and is far less toxic. It is especially superior to the known compounds in the ratio of $LD_{50}/ED_{50}$ as shown in the following table.

TABLE

| Compound | Analgesic[1] $ED_{50}$ (mg./kg.) | Toxicity[2] $LD_{50}$ (mg./kg.) | $LD_{50}/ED_{50}$ |
|---|---|---|---|
| Compound I (hydrochloride) | 2.74 | >1,500 | >547 |
| 1-phenacyl-2,3-dimethyl-3-(3-hydroxyphenyl)-piperidine hydrochloride | 7.15 | 800 | 111.8 |
| Meperidine | 12.5 | 273.5 | 21.9 |
| Morphine | 4.2 | 407 | 96.9 |

[1] Calculated from the pain reaction time of each group of the mice by hot plate at time after subcutaneous administration.
[2] Calculated from the mortality of groups of five mice for 24 hours after subcutaneous administration.

According to the present invention, compound (I) can be prepared by reacting 2,3-dimethyl-3-(3-hydroxyphenyl)-piperidine with styrene-oxide. The reaction can be accomplished with or without using an inert solvent such as benzene, toluene, methanol, ethanol. Furthermore the reaction may be carried out even at room temperature by treating the reaction mixture for a long period of time, but it is preferred to carry it out under heating for about 30–60 minutes. The 1-(β-hydroxyphenethyl)-2,3-dimethyl-3-(3-hydroxyphenyl)-piperidine thus prepared can be converted into an acid addition salt such as the hydrochloride, hydrobromide, sulfate, acetate, citrate or tartrate by treating the compound with the corresponding acid in a conventional manner.

The starting 2,3-dimethyl-3-(3-hydroxyphenyl)-piperidine is also a novel compound which can be prepared by hydrolyzing 2,3-dimethyl-3-(3-alkoxyphenyl)-piperidine with a mineral acid such as hydrochloric acid, hydrobromic acid or sulfuric acid.

Alternatively, the 1-(β-hydroxyphenethyl)-piperidine compound (I) can be prepared by reducing 1-phenacyl-2,3-dimethyl-3-(3-hydroxyphenyl)-piperidine. The reduction may be carried out by a catalytic reduction in the presence of the catalyst such as platinum, palladium, Raney-nickel, etc. or by a chemical reduction in the presence of a hydrogen donor such as lithium-aluminium-hydride, sodium borohydride, etc., preferably at room temperature in a solvent such as methanol, ethanol, ether, dioxane, etc.

EXAMPLE 1

A mixture of 5 g. of 2,3-dimethyl-3-(3-methoxyphenyl)-piperidine hydrochloride and 25 ml. of 48% aqueous hydrobromic acid was refluxed for 40 minutes. The reaction mixture was concentrated under reduced pressure and a quantity of water was added to the residue. The mixture was made alkaline with concentrated aqueous ammonia and extracted with ether. The extract was dried and the ether evaporated. The residue was dissolved in acetone and hydrogen chloride gas was bubbled into the solution whereby 4.23 g. of 2,3-dimethyl-3-(3-hydroxyphenyl)-piperidine hydrochloride melting at 221–223° C. was obtained.

2.8 g. of the hydrochloride was dissolved in water and the solution was neutralized with aqueous ammonia. The solution was extracted with ether. The extract was dried and the ether evaporated whereby 2.2 g. of the crude base of 2,3-dimethyl-3-(3-hydroxyphenyl)-piperidine was obtained.

2.2 g. of the free base was heated with 1.2 g. of styrene-oxide in 3 ml. of ethanol on a boiling water bath for an hour. After cooling, 40 ml. of water and 40 ml. of ether were added to the reaction mixture and the mixture was shaken. The ether layer was separated from the water layer and extracted with 10% aqueous hydrochloric acid. The extract was made alkaline with ammonia and was extracted with ether. The extract was dried and was evaporated to remove ether to give 3.27 g. of viscous residue. A small quantity of ether was added to the residue and the resultant crystals were recrystallized from ethanol. Thus, 1.5 g. of 1-(β-hydroxyphenethyl)-2,3-dimethyl-3-(3-hydroxyphenyl)-piperidine was obtained as prismatic crystals melting at 193–196° C.

2.0 g. of the free base thus obtained was dissolved in about 30 ml. of acetone and hydrogen chloride gas was bubbled into the solution. The precipitated crystals were collected by filtration and recrystallized from a solvent system of methanol-acetone whereby 1.9 g. of 1-(β-hydroxyphenethyl)-2,3-dimethyl-3-(3-hydroxyphenyl)-piperidine hydrochloride were obtained as crystals melting at 216–218° C. (decomp.).

Analysis.—Calculated for $C_{21}H_{27}O_2N \cdot HCl$ (percent): C, 69.69; H, 7.80; N, 3.87. Found (percent): C, 69.58; H, 7.94; N, 3.77.

EXAMPLE 2

2.0 g. of 1-phenacyl-2,3-dimethyl-3-(3-hydroxyphenyl)-piperidine hydrochloride and 0.6 g. of sodium borohydride were dissolved in 40 ml. of ethanol and the solution was allowed to stand overnight at room temperature. Then, a quantity of water was added to the solution, the mixture was made alkaline with concentrated aqueous ammonia and extracted with chloroform. The extract was washed with water and the solvent evaporated. 5 ml. of ether was added to the resultant viscous residue and the mixture was allowed to stand. 1.2 g. of 1-(β-hydroxyphenethyl)-2,3-dimethyl-3-(3-hydroxyphenyl)-piperidine were obtained as crystals melting at 175–180° C. The crystals were recrystallized from ethanol to form colorless prisms melting at 192–195° C.

*Analysis.*—Calculated for $C_{21}H_{27}O_2N$ (percent): C, 77.50; H, 8.36; N, 4.30. Found (percent): C, 77.65; H, 8.14; N, 4.44.

EXAMPLE 3

1 g. of 1-phenacyl-2,3-dimethyl-3-(3-hydroxyphenyl)-piperidine hydrochloride was added to 50 ml. of methanol. The mixture was catalytically reduced in the presence of 0.3 g. of 10% palladium-carbon at room temperature under atmospheric pressure until 65 ml. of hydrogen gas was absorbed. After filtering off the catalyst, the reaction mixture was evaporated to remove methanol and the residue was dissolved in water. The solution was made alkaline with concentrated aqueous ammonia and was extracted with chloroform. The extract was evaporated to remove the solvent and the resultant residue treated as described in Example 2. 500 mg. of 1-(β-hydroxyphenethyl)-2,3-dimethyl-3-(3-hydroxyphenyl)-piperidine were obtained as prismatic crystals melting at 193–196° C.

What we claim is:
1. 1-(β-hydroxyphenethyl)-2,3-dimethyl-3-(3-hydroxyphenyl)-piperidine or acid addition salts thereof.

References Cited

UNITED STATES PATENTS

| | | | |
|---|---|---|---|
| 1,980,638 | 11/1934 | Scheuing et al. | 260—294.7 |
| 3,056,797 | 10/1962 | Shapiro et al. | 260—294.7 |

FOREIGN PATENTS

| | | | |
|---|---|---|---|
| 42,167 | 1/1967 | Japan | 260—294.7 |

OTHER REFERENCES

Chemical Abstracts, vol. 66: 94913n, May 1967, Societe d'Etudes.

J. Ned Chem., vol. 8: 313–16, May 1965, R51J5, Kugita et al.

Chemical Abstracts, vol. 59: 10005a, October 1963.

HENRY R. JILES, Primary Examiner

S. D. WINTERS, Assistant Examiner

U.S. Cl. X.R.

260—294; 424—267